F. C. PILLSBURY.
APPARATUS FOR SPRAYING OIL ON ROAD SURFACES.
APPLICATION FILED MAR. 27, 1911.
1,062,029.
Patented May 20, 1913.
2 SHEETS—SHEET 1.
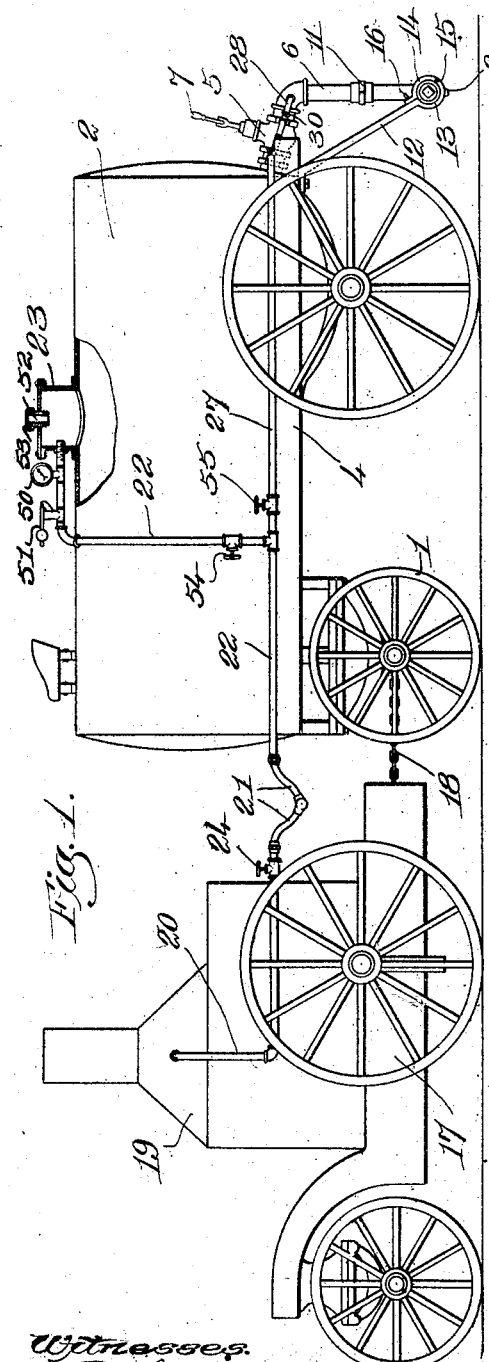
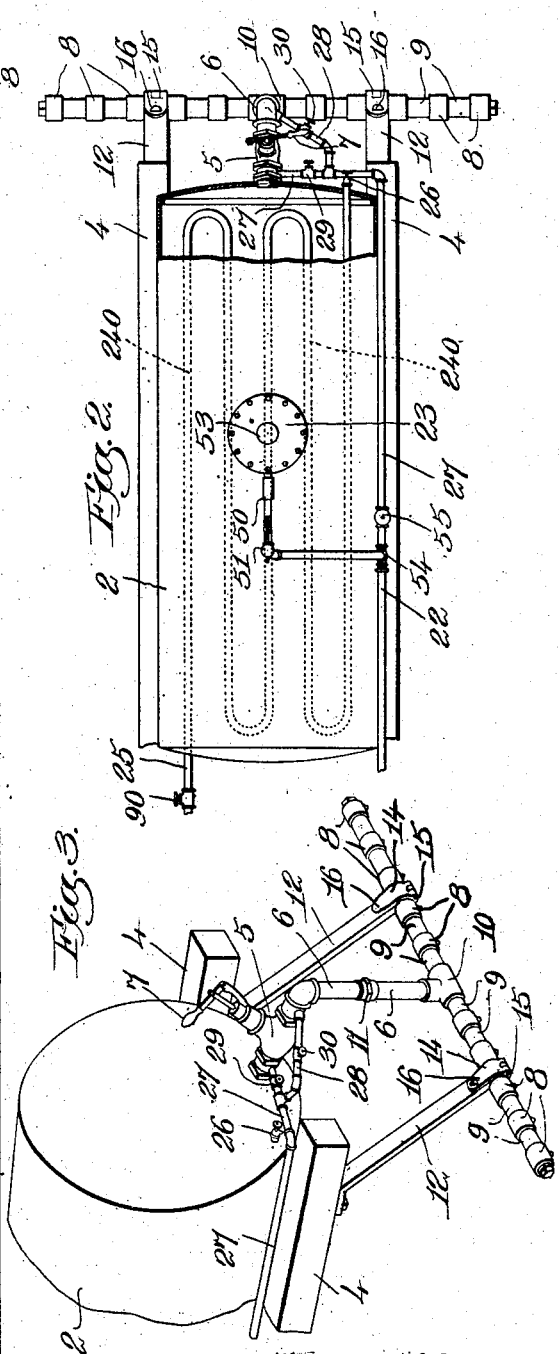
Witnesses.
Thomas J. Drummond
Edward D. Allen
Inventor.
Franklin C. Pillsbury,
by Edwards Head & Smith
Attys.

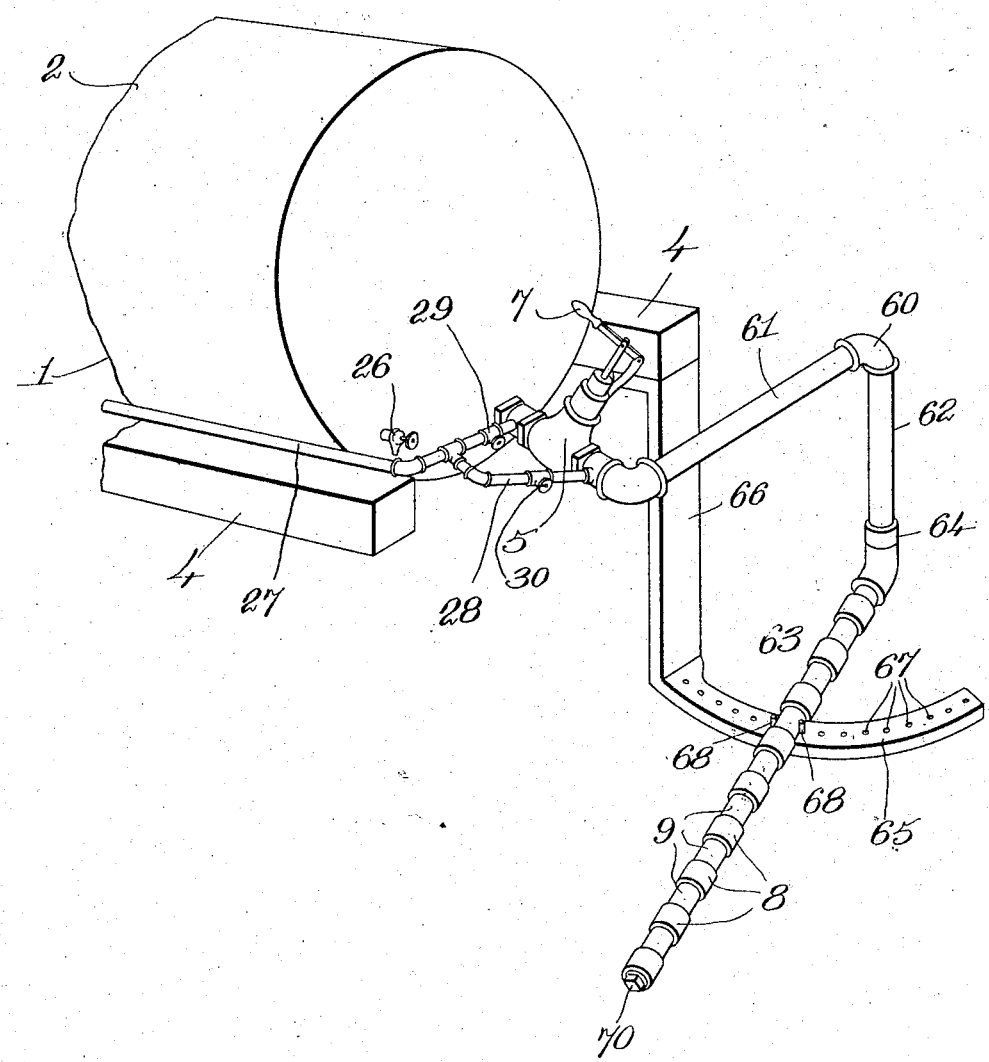

UNITED STATES PATENT OFFICE.

FRANKLIN C. PILLSBURY, OF BOSTON, MASSACHUSETTS, ASSIGNOR TO WALTER CRESSY, OF GLOUCESTER, MASSACHUSETTS.

APPARATUS FOR SPRAYING OIL ON ROAD-SURFACES.

1,062,029.  Specification of Letters Patent.  Patented May 20, 1913.

Application filed March 27, 1911. Serial No. 617,049.

*To all whom it may concern:*

Be it known that I, FRANKLIN C. PILLSBURY, a citizen of the United States, residing at Boston, county of Suffolk, State of Massachusetts, have invented an Improvement in Apparatus for Spraying Oil on Road-Surfaces, of which the following description, in connection with the accompanying drawing, is a specification; like characters on the drawing representing like parts.

This invention relates to an apparatus for spraying oil or other road-surfacing material on a road surface directly from a tank wagon.

My improved apparatus comprises a spraying attachment adapted to be readily applied to a tank wagon and means for introducing steam under pressure directly into the tank of the tank wagon and on top of the body of oil therein, so that the steam pressure within the tank will furnish the desired pressure for forcing the oil out through the spray device and will also constitute means for heating the oil in the tank, thus increasing its fluidity so that it will flow more freely. Where the steam is thus admitted directly to the interior of the tank, said steam will not only force all of the oil out of the tank, but when the oil is exhausted the steam will then be discharged through the spray device, and during its discharge it will heat and thus increase the fluidity of any oil or other surfacing material which may remain in or upon the spray device, and will also blow out and clean the spray device thoroughly so that said device will be ready for use again without any further attention as soon as the tank has been filled.

I will first describe one embodiment of my invention and then point out the novel features thereof in the appended claims.

In the drawings, Figure 1 shows in side view a tank wagon having my improvements applied thereto, together with a steam generator in the form of a traction engine, steam roller, or other device for drawing the wagon; Fig. 2 is a plan view of the tank wagon with a portion broken out; Fig. 3 is a perspective view of the rear end of the tank wagon showing the spray device attached thereto; Fig. 4 is a view similar to Fig. 3 showing one way of varying the amount of oil sprayed per square yard of road surface.

As stated above, one of the features of my invention consists in admitting steam under pressure directly to the tank containing the oil which is to be sprayed and to which the spray device is to be attached, so that the steam will not only provide the required pressure for spraying the oil, but will serve to heat the oil to some extent and thus increase its fluidity, and will also act as a means for thoroughly cleaning out the spray device when the tank has been emptied.

In the preferred embodiment of my invention I propose to attach the spray device directly to a tank wagon having a tank thereon adapted to withstand internal pressure and in which the oil or other road-surfacing material is contained, although the invention might be used in connection with any oil-receiving receptacle adapted to be transported over a road and constructed to withstand internal steam pressure.

In the embodiment of the invention herein shown, 1 designates generally a tank wagon having a tank 2 thereon in which the oil or other road-surfacing material is received. This tank wagon comprises in its construction two side sills 4, as usual in devices of this class, between which the tank 2 is supported. Said tank has connected to the rear end thereof a quick-action valve 5 to which is connected a pipe 6 leading to the spray device, said valve having a handle 7 by which it may be quickly opened or closed. The spray device may be of various constructions without departing from the invention. As herein shown it comprises a plurality of spray nozzles 8 which are connected in line so as to form what amounts to a spray pipe provided with spray apertures on its under side. One or more such spray pipes may be used according to the amount of oil it is desired to spray on the road surface. One convenient construction is that in which the various nozzles 8 are connected by nipples or short pipe sections 9 so that the nipples of the pipe sections, together with the nozzles 8, form the spray pipe. This spray pipe is shown in Fig. 3 as made in two halves connected by the T 10 to which the pipe 6 is secured, and I will preferably make the pipe 6 in two parts which are connected by an ordinary union 11, or other detachable connection, to facilitate the removal of the spray device. The spray device is shown as supported in arms or brackets 12 that are secured to the sills 4 of the wagon, and each arm has at its lower end a curved seat portion 13 to receive the spray device and a keeper 14 hinged to the seat portion 13 at 15 and adapted to clamp the spray device to the seat portion, said keepers being locked or fastened to the brackets 12 in any suitable way as by means of clamping bolts 16. This provides a simple construction whereby the spray device is detachably secured to the tank wagon and can be readily removed therefrom by simply disconnecting the union 11 and unfastening the keepers 14.

In order to practice my invention it is necessary to have a source of steam supply associated with the tank wagon. This might be accomplished by mounting a boiler directly on the tank wagon or by using the tank wagon in connection with a steam generator. One practical arrangement is to connect up the tank wagon to a steam roller or traction engine which will not only furnish the power for drawing the tank wagon over the road surface, but will also provide the necessary steam pressure within the tank. In the drawings I have shown at 17 a self-propelled vehicle which might be a steam roller or traction engine, and to which the tank wagon is connected by means of chains or other connections 18. This self-propelled vehicle is provided with a steam boiler 19 of some suitable construction, and means are provided for delivering steam from the boiler 19 into the tank 2. This may conveniently be done by providing the boiler 19 with a steam pipe 20 which connects by means of a flexible pipe 21 with a steam pipe 22 on the tank wagon, said pipe leading to and entering the upper part of the tank at some suitable point, as, for instance, the dome 23. The pipe 20 will be provided with a suitable valve 24 to control the supply of steam to the tank. When the device is in use the valve 24 will be opened thus admitting steam under pressure into the tank 2 above the body of oil therein, and the steam pressure within the tank 2 will place the oil therein under pressure so that when the valve 5 is opened, the oil will be forced out through the spray device. At the same time the steam in said tank 2 will heat the oil more or less and thus increase its fluidity.

Another advantage of using the steam directly on top of the body of oil within the tank 2 is that when the oil has been entirely discharged from the tank the steam within the tank will blow out through the spray device until the valve 5 is closed. The admission of steam to the spray device heats the latter and heats any oil which may be left therein or thereon, thus increasing the fluidity of said oil and the force of the steam will blow the oil all out of the spray device, thus leaving it perfectly clean. This is a decided advantage because where the spray device is not cleaned out in this way the oil which remains therein is apt to harden or congeal, thus clogging it up and rendering it difficult to start the spray up again when the tank has been re-filled.

If the nature of the oil or other surfacing material is such that it will not be sufficiently heated merely by the steam which is admitted to the tank above the body of oil, I may provide an additional heating coil 240 within the tank which will be connected to a suitable source of steam supply. In Fig. 2 I have shown this coil 240 as connected by a pipe 25 which leads to the boiler 19. The end of the heating coil 240 terminates in a valve 26 by which water of condensation may be drained off. The pipe 25 will be provided with a valve 90 to regulate the supply of steam to the coil 240. I have also shown the pipe 22 as having connected thereto a pipe 27 which leads to the casing of the valve 5 between the latter and tank wagon, and this pipe 27 is also provided with another branch 28 which leads to the pipe 6 on the delivery side of the valve 5, the two pipes 27, 28 being controlled by valves 29, 30. The advantage of this construction is that steam may be admitted to the valve 5 on either side thereof, thereby warming the latter, or steam may be admitted directly to the spray device without passing through the tank wagon if it is desired to heat the oil in the spray device or to blow it out.

50 designates a pressure gage connected to the pipe 22 by which the steam pressure in the tank 2 can be determined, and 51 designates a safety valve which can be set to relieve the steam pressure if it exceeds a predetermined amount.

The dome 23 has a nipple or connection 52 leading into its upper end which nipple is normally closed by a cap 53. The purpose of this is to provide means for filling the tank, and this can be done if desired while the tank is under pressure by simply removing the cap 53 and connecting a hose to the nipple 52 and then forcing the oil or liquid into the tank.

The pipes 22 and 27 are provided with valves 54 and 55.

It will readily be seen that if the spray pipe is set diagonally the total width of road which a length of spray pipe will cover is less than if the spray pipe extended at right angles to the direction of movement, and, therefore, when the pipe is in the angular position a greater quantity of oil per square yard will be sprayed on the road surface than when the pipe extends transversely. There are various ways in which the pipe could be sustained so as to permit it to swing into different angular positions. If the spray pipe is connected centrally to the supply pipe 6, as shown in Fig. 3, a swivel connection could be readily provided between the supply pipe and the spray pipe so as to permit the spray pipe to be swung into different angular positions.

In Fig. 4 I have shown a construction wherein the spray pipe is connected at one end to the supply pipe, said supply pipe being shown at 60 and having the horizontally-extending portion 61 and the vertically-extending portion 62 which leads into the end of the spray pipe 63. This spray pipe 63 is connected to the vertical portion 62 of the supply pipe by a swivel joint 64 which permits the spray pipe to be swung into different angular positions. Said pipe may be sustained in any suitable way as by means of a horizontally-disposed arm 65 extending from a bracket 66 extending from one of the sills 4 of the wagon. If desired this arm may be provided with apertures 67 adapted to receive positioning pins 68 between which the spray pipe 63 is held so that said pipe may be maintained in any desired position. When the pipe is swung into a diagonal position as shown in Fig. 4 it will cover a less width of road surface than when it stands transversely, as shown in Fig. 3, but as the same amount of oil is sprayed from the pipe the result will be that a larger quantity of oil per square yard of road surface covered is delivered than if the pipe stood at right angles to the direction of movement of the wagon. If it is desired to cover as great a width of road surface with the spray pipe standing diagonally as is covered when the pipe extends transversely, then I would provide for extending the spray pipe so as to make it longer. This could easily be done by adding more of the spray nozzle section 8 and nipples 9 to the pipe, it being understood that these sections are readily detachable so that by using more of them a pipe of any length can be produced. I have, therefore, not only a spray pipe capable of swinging into different angular positions in a horizontal plane, but also an extensible and contractible spray pipe. The end of the spray pipe is closed by a suitable plug 70.

I am aware that it has heretofore been proposed to admit compressed air to the oil-containing tank with which a spray device is used for the purpose of providing within the tank a suitable pressure to force the liquid out through the spray device. My invention is to be distinguished from devices of this nature, however, in that the pressure is secured by the use of steam which is admitted under pressure directly to the tank and which has the capacity for not only heating the oil within the tank, but also cleaning out automatically the spray device.

My invention is not confined to use in connection with heavy oils, such as are commonly used in the surfacing of roads, but may be used in connection with any road-surfacing material which is capable of being sprayed from a tank.

Having fully described my invention, what I claim as new and desire to secure by Letters Patent is:—

1. The combination with a tank wagon having a discharge pipe and a valve in said pipe, of a spray pipe communicating with the discharge pipe, a steam pipe communicating with said discharge pipe intermediate the valve and the tank whereby steam may be admitted to the tank through the discharge pipe, a steam pipe communicating with said discharge pipe in rear of the valve whereby steam may be blown through the spray pipe, and means for applying a pressure to the tank above the liquid therein.

2. The combination with a tank wagon having an outlet pipe and a valve in said pipe, of a steam pipe communicating with said outlet pipe intermediate the valve and the tank whereby steam may be admitted to the tank through the outlet pipe, a steam pipe communicating with said outlet pipe in rear of the valve whereby steam may be blown through the spray pipe, and a spray pipe secured to the end of said outlet pipe.

3. The combination with a tank wagon having an outlet pipe and a valve in said pipe, of a steam pipe communicating with said outlet pipe intermediate the valve and the tank whereby steam may be admitted to the tank through the outlet pipe, a steam pipe communicating with said outlet pipe in rear of the valve whereby steam may be blown through the spray pipe, and a spray pipe removably secured to said outlet pipe in rear of the steam pipes.

In testimony whereof, I have signed my name to this specification, in the presence of two subscribing witnesses.

FRANKLIN C. PILLSBURY.

Witnesses:
  LOUIS C. SMITH,
  THOMAS J. DRUMMOND.

---

Copies of this patent may be obtained for five cents each, by addressing the "Commissioner of Patents, Washington, D. C."